United States Patent
Nishii et al.

(10) Patent No.: US 12,179,183 B2
(45) Date of Patent: Dec. 31, 2024

(54) FUNCTIONAL STRUCTURE

(71) Applicants: NATIONAL UNIVERSITY CORPORATION HOKKAIDO UNIVERSITY, Sapporo (JP); FURUKAWA ELECTRIC CO., LTD., Tokyo (JP)

(72) Inventors: Mai Nishii, Tokyo (JP); Yuichiro Banba, Tokyo (JP); Kaori Sekine, Tokyo (JP); Yukako Nakai, Tokyo (JP); Masayuki Fukushima, Tokyo (JP); Sadahiro Kato, Tokyo (JP); Takao Masuda, Sapporo (JP); Yuta Nakasaka, Sapporo (JP); Takuya Yoshikawa, Sapporo (JP)

(73) Assignees: NATIONAL UNIVERSITY CORPORATION HOKKAIDO UNIVERSITY, Sapporo (JP); FURUKAWA ELECTRIC CO., LTD., Tokyo (JP)

( * ) Notice: Subject to any disclaimer, the term of this patent is extended or adjusted under 35 U.S.C. 154(b) by 399 days.

(21) Appl. No.: 17/299,718

(22) PCT Filed: Dec. 3, 2019

(86) PCT No.: PCT/JP2019/047293
§ 371 (c)(1),
(2) Date: Jun. 3, 2021

(87) PCT Pub. No.: WO2020/116470
PCT Pub. Date: Jun. 11, 2020

(65) Prior Publication Data
US 2022/0048014 A1    Feb. 17, 2022

(30) Foreign Application Priority Data
Dec. 3, 2018 (JP) .................. 2018-226919

(51) Int. Cl.
B01J 29/46 (2006.01)
B01J 35/56 (2024.01)
B01J 37/02 (2006.01)

(52) U.S. Cl.
CPC ............... *B01J 29/46* (2013.01); *B01J 35/56* (2024.01); *B01J 37/0209* (2013.01); *B01J 2229/183* (2013.01); *B01J 2229/40* (2013.01)

(58) Field of Classification Search
CPC ...... B01J 29/041; B01J 29/042; B01J 29/043; B01J 29/044; B01J 29/2922; B01J 29/24;
(Continued)

(56) References Cited

U.S. PATENT DOCUMENTS 4,801,573 A    1/1989   Eri et al.
5,275,720 A *  1/1994   Ward ........................ C07C 5/41
                                                              208/46
(Continued)

FOREIGN PATENT DOCUMENTS

CN    102596404 A    7/2012
CN    103889577 A    6/2014
(Continued)

OTHER PUBLICATIONS

Wu et al., "Hydrothermal synthesis of LTA-encapsulated metal clusters and consequences for catalyst stability, reactivity, and selectivity", Journal of Catalysis, 311, (2014), 458-468.*
(Continued)

*Primary Examiner* — Colin W. Slifka
(74) *Attorney, Agent, or Firm* — Oblon, McClelland, Maier & Neustadt, L.L.P.

(57) ABSTRACT

A functional structure which can resist a decrease in the functions of the functional material caused by influences such as force and heat and thus have a long life. The functional structure includes supports each having a porous
(Continued)

structure and including a zeolite-type compound, and at least one functional material present in the supports, in which each of the supports has channels communicating with one another, the functional material is present at least in the channel of each of the supports, the functional material present in the supports includes a metal element (M), and the content of the metal element (M) is more than 2.5 mass % with respect to the functional structure.

10 Claims, 4 Drawing Sheets

(58) Field of Classification Search
CPC ... B01J 29/44; B01J 29/46; B01J 29/76; B01J 29/7615; B01J 29/7414; B01J 2229/14; B01J 2229/186; B01J 2229/22; B01J 37/02; B01J 37/08; B01J 37/10; B01J 37/16; B01J 35/006; B01J 35/023; B01J 35/109; B01J 35/1057; B01J 35/1061; C10G 2300/70
USPC .................................. 502/60, 71, 74, 77, 78
See application file for complete search history.

(56) References Cited

U.S. PATENT DOCUMENTS

| | | | |
|---|---|---|---|
| 5,994,603 | A | 11/1999 | Mohr et al. |
| 6,040,259 | A | 3/2000 | Mohr et al. |
| 6,831,203 | B1 | 12/2004 | Mohr et al. |
| 11,161,101 | B2 * | 11/2021 | Kato ............... B01J 23/464 |
| 11,547,987 | B2 * | 1/2023 | Masuda ............ B01J 29/085 |
| 11,648,538 | B2 * | 5/2023 | Masuda ............ B01J 29/63 502/74 |
| 11,648,542 | B2 * | 5/2023 | Masuda ........... B01J 29/7215 502/64 |
| 11,654,422 | B2 * | 5/2023 | Masuda ........... B01J 37/0211 502/64 |
| 11,655,157 | B2 * | 5/2023 | Masuda ............ B01J 29/405 502/73 |
| 11,666,894 | B2 * | 6/2023 | Masuda ............ B01J 37/10 423/418.2 |
| 11,680,211 | B2 * | 6/2023 | Masuda ............ C10G 45/08 502/64 |
| 11,684,909 | B2 * | 6/2023 | Masuda ............ C07C 1/20 502/87 |
| 2003/0109383 | A1 | 6/2003 | Koike et al. |
| 2012/0193270 | A1 | 8/2012 | Inamura et al. |
| 2014/0274664 | A1 | 9/2014 | Scott et al. |
| 2014/0303266 | A1 | 10/2014 | Hyman |
| 2016/0023913 | A1 | 1/2016 | Goel et al. |
| 2016/0030934 | A1 | 2/2016 | Zhan et al. |
| 2016/0137516 | A1 * | 5/2016 | Kegnæs ............ B01J 29/044 585/467 |
| 2017/0036197 | A1 | 2/2017 | Kegnæs et al. |

FOREIGN PATENT DOCUMENTS

| | | |
|---|---|---|
| JP | 3-502067 A | 5/1991 |
| JP | 2000-511107 A | 8/2000 |
| JP | 2014-534902 A | 12/2014 |
| JP | 2017-515785 A | 6/2017 |
| JP | 2017-128480 A | 7/2017 |
| JP | 2017-523113 A | 8/2017 |
| WO | WO 89/03725 A1 | 5/1989 |
| WO | WO 97/45197 A1 | 12/1997 |
| WO | WO 2010/097108 A1 | 9/2010 |
| WO | WO 2013/057319 * | 4/2013 |
| WO | WO 2013/057319 A2 | 4/2013 |
| WO | WO 2015/155216 A1 | 10/2015 |
| WO | WO 2016/014691 A1 | 1/2016 |
| WO | WO 2017/072698 A1 | 5/2017 |
| WO | WO 2018/164989 A1 | 9/2018 |

OTHER PUBLICATIONS

Warnken et al., "Redox behaviour of SnO2 nanoparticles encapsulated in the pores of zeolites towards reductive gas atmospheres studied by in situ diffuse reflectance UV/VIS and Mossbauer sepectroscopy", Phys. Chem. Chem. Phys., 2001, 3, 1870-1876.*
Machine Translation of JP 2017-128480A, Jul. 27, 2017.*
Mika Huuhtanen, Zeolite Catalysts in the Reduction of NOx in Lean Auromotive Exhause Gas Conditions, Faculty of Technology, Department of Process and Environmental Engineering, University of Oulu, ACTA Universitatis Ouluensis C Technical 261 (2006).*
Combined Chinese Office Action and Search Report issued Feb. 2, 2023, in corresponding Chinese Patent Application No. 201980077949.2 (with English Translation), 24 pages.
International Search Report issued on Feb. 25, 2020 in PCT/JP2019/047293 filed on Dec. 3, 2019, 4 pages.
Laprune, D. et al., "Highly Dispersed Nickel Particles Encapsulated in Multi-hollow Silicalite-1 Single Crystal Nanoboxes:. Effects of Siliceous Deposits and Phosphorous Species on the Catalytic Performances," ChemCatChem, vol. 9, No. 12, 2017, pp. 2297-2307, 12 total pages.
Extended European Search Report issued Jul. 21, 2022 in European Patent Application No. 19893656.9, 8 pages.
Chengyi Dai, et al., "Hollow zeolite encapsulated Ni—Pt bimetals for sintering and coking resistant dry reforming of methane," Journal of Materials Chemistry A, vol. 3, XP055336366, 2015, 9 pages.
Office Action issued Nov. 12, 2024, in corresponding European Patent Application No. 19893656.9, 5 pages.

* cited by examiner

FUNCTIONAL STRUCTURE

TECHNICAL FIELD

The present invention relates to a functional structure including supports (frameworks) with a porous structure and a functional material, and specifically relates to a functional structure including frameworks with a porous structure and a functional material having a high metal content present in the frameworks.

BACKGROUND ART

In a petrochemical complex, an oil refinery produces, from crude oil, a petrochemical raw material called naphtha and various fuels such as heavy oil, light oil, kerosene oil, gasoline, and LP gas. Crude oil, which is a mixture including the petrochemical raw material, the various fuels, and various impurities, needs to be subjected to a distillation process and a separation process for obtaining each component contained in crude oil.

The petroleum refining process heats crude oil at a plate column in an atmospheric distillation unit to separate components based on differences in the boiling point of the components, and concentrates each of the separated components. In this process, low boiling point materials such as LP gas and naphtha are removed at an upper plate column of the atmospheric distillation unit, and high boiling point materials such as heavy oil are removed at a bottom of the atmospheric distillation unit. Each separated and concentrated material is then subjected to a secondary process such as desulfurization so that various fuel products are obtained.

In general, the petroleum refining process uses a petroleum reforming catalyst to efficiently reform low boiling point materials such as naphtha into high octane number products such as gasoline. The naphtha fraction in crude oil is low octane number and is not suitable as gasoline for vehicles. The petroleum reforming catalyst is used to reform the paraffin and naphthene components with low octane number in the naphtha fraction into aromatic components with high octane number for the production of reformed gasoline with properties suitable for vehicle fuels.

The production of heavy oil from crude oil is followed by a process that includes subjecting the heavy oil to hydrodesulfurization using a hydrodesulfurization unit such as a direct or indirect sulfurization unit to obtain desulfurized heavy oil, desulfurized heavy gas oil, or the like, and then hydrocracking the desulfurized heavy oil, the desulfurized heavy gas oil, or the like to increase the production of desulfurized naphtha, desulfurized kerosene oil, desulfurized light oil, and so on. For example, atmospheric distillation residue oil is subjected to hydrocracking to increase the yield of the desulfurized kerosene oil fraction, the desulfurized light oil fraction, and the desulfurized naphtha fraction and to decrease the yield of the desulfurized heavy oil, and the desulfurized heavy oil is fed to a catalytic cracking unit to produce the LPG fraction, the FCC gasoline fraction, and the LCO fraction, so that the residual oil is decreased while the light oil fraction is increased. Catalysts proposed for this process include a catalyst having a crystalline aluminosilicate support which is typical zeolite, and a hydrocracking catalyst including zeolite and porous inorganic oxide at a prescribed ratio.

For example, a hydrocracking catalyst is disclosed (see Patent Document 1), which includes a support made of Y zeolite; and a metal material selected from Pd, Pt, Co, Fe, Cr, Mo, W, and mixtures thereof, which is deposited on the surface of the support.

In the field of automobiles, an exhaust-gas catalyst structure for diesel engine vehicles is proposed, which is a ceramic catalyst body using a ceramic support on a surface of a substrate ceramic and prepared by supporting a main catalyst component and a sub catalyst component on the ceramic support. In the ceramic catalyst body, the surface of the ceramic support made of γ-alumina has a large number of pores including lattice defects and so on in the crystal lattices, and the main catalyst component such as Ce—Zr or Pt is directly supported on or near the surface of the ceramic support (see Patent Document 2).

Patent Document 1: U.S. Published Patent Application Publication, No. 2016/0030934, Specification Patent Document 2: U.S. Published Patent Application Publication, No. 2003/0109383, Specification Patent Document 3: Japanese Unexamined Patent Application, Publication No. H03-502067

Patent Document 4: Japanese Unexamined Patent Application, Publication No. 2017-128480

Patent Document 5: PCT International Publication No. WO2010/097108

DISCLOSURE OF THE INVENTION

Problems to be Solved by the Invention

Unfortunately, in the catalyst structure mentioned above, the catalyst particles supported on or in the vicinity of the surface of the support can easily move in the support and undergo aggregation (sintering) due to an influence, such as force or heat, from a fluid material being reformed in the reform process. The aggregation of the catalyst particles causes a decrease in the effective surface area of the catalyst, which leads to a decrease in the catalytic activity and thus makes the life of the catalyst shorter than usual. This requires the catalyst structure to be replaced or refreshed at short time, which raises problems such as complicated replacement operation and failure of resource-saving. In general, petroleum reforming catalysts are attached to the downstream side of an atmospheric distillation unit and are used continuously in the petroleum refining process. Such catalysts are difficult to subject to a reactivation technique, and even if they can be subjected to a reactivation technique, its operation would be very complicated.

For practical use, it is required to have further improved catalytic activity. An idea to address the requirement is, for example, to increase the content of the catalyst particles. Specifically, Patent Document 3 discloses that the rate of CO conversion by Fischer-Tropsch synthesis reaction (hereinafter referred to as "FT synthesis reaction") increases as the content of the cobalt metal particle with respect to the catalyst support increases to about 40%. On the other hand, unfortunately, as the content of the catalyst particle increases, the number of the catalyst particles on the surface of the support increases so that the catalyst particles become more likely to aggregate.

Suppression or prevention of an aging deterioration in function mentioned above is a task to be addressed not only in the field of catalysts but also in other many technical fields, and there is a demand for a solution for long-term maintenance of function. Patent Documents 4 and 5 disclose a technique for preventing catalyst aggregation, which includes preparing amorphous silica-coated metal fine particles using an emulsion technique, and then hydrothermally treating the particles to incorporate metal fine particles into zeolite. The emulsion technique to prepare the amorphous silica-coated metal fine particles includes mixing a surfactant and a metal source in an organic solvent to form an emulsion, adding a reducing agent to the emulsion to form metal fine particles, and then adding a silane coupling agent to the emulsion to form a silica layer on the surface of the metal fine particles. Unfortunately, when the metal particles are prepared by such an emulsion technique, the size of the resulting particles is affected by the size of the droplets formed during the emulsion forming process and by the tendency of the metal particles to aggregate. In general, base metals can hardly remain in a nanoparticle size. In fact, Patent Documents 4 and 5 only show nanosized noble metal particle samples as examples and do not disclose nanosized particles of any base metal or any oxide of the base metal that is vulnerable to aggregation. It has also been reported that, in the emulsion technique according to Patent Documents 4 and 5, the organic solvent and the surfactant can remain, and the material, such as the reagent, used during the formation of a zeolite structure can remain as an impurity, which can have an adverse effect on the thermal stability of zeolite.

It is an object of the present invention to provide a functional structure which can enhance various functions of a functional material and which can resist a decrease in the functions of the functional material caused by influences such as force and heat and thus have a long life.

Means for Solving the Problems

As a result of intensive studies for achieving the object, the inventors have found a functional structure including: supports each having a porous structure and including a zeolite-type compound; and at least one functional material present in the supports, in which each of the supports has channels communicating with one another, the functional material is present at least in the channel of each of the supports, the functional material present in the supports includes a metal element (M), and the content of the metal element (M) is more than 2.5 mass % with respect to the functional structure, and have completed the present invention based on the findings that such a functional structure can enhance various functions of the functional material and can resist a decrease in the functions of the functional material caused by influences such as force and heat and thus have a long life.

Specifically, the present invention has the following principal features.

(1) A functional structure including: supports each having a porous structure and including a zeolite-type compound; and at least one functional material present in the supports, wherein each of the supports has channels communicating with one another, the functional material is present at least in the channel of each of the supports, the functional material present in the supports includes a metal element (M), and the content of the metal element (M) is more than 2.5 mass % with respect to the functional structure.

(2) The functional structure according to aspect (1), wherein the functional material present in the supports includes at least one of a metal and a metal oxide.

(3) The functional structure according to aspect (1) or (2), wherein the channels have any one of a one-dimensional pore, a two-dimensional pore, and a three-dimensional pore of a framework structure of the zeolite-type compound, and have an enlarged pore portion different from the one-dimensional pore, the two-dimensional pore, and the three-dimensional pore, and the functional material is present at least in the enlarged pore portion.

(4) The functional structure according to aspect (3), wherein the enlarged pore portion connects a plurality of pores constituting any one of the one-dimensional pore, the two-dimensional pore, and the three-dimensional pore.

(5) The functional structure according to aspect (3) or (4), wherein the functional material has an average particle size larger than an average inner diameter of the channels and equal to or smaller than an inner diameter of the enlarged pore portion.

(6) The functional structure according to any one of aspects (1) to (5), wherein the functional material includes a catalytic material, and each of the supports carries at least one catalytic material.

(7) The functional structure according to any one of aspects (1) to (6), wherein the functional material has the average particle size of 0.08 nm to 50 nm.

(8) The functional structure according to any one of aspects (1) to (7), wherein the ratio of the average particle size of the functional material to the average inner diameter of the channels is from 0.05 to 500.

(9) The functional structure according to any one of aspects (1) to (8), wherein the channels have an average inner diameter of 0.1 nm to 1.5 nm.

(10) The functional structure according to any one of aspects (1) to (9), further including at least one additional functional material held on an outer surface of the supports.

(11) The functional structure according to aspect (10), wherein the content of at least one functional material present in the supports is higher than the content of the at least one additional functional material held on the outer surface of the supports.

(12) The functional structure according to any one of aspects (1) to (11), wherein the zeolite-type compound is a silicate compound.

(13) A method of producing a functional structure, the method including: a calcination step for calcining a precursor material (B) including a metal-containing solution and a precursor material (A) for forming a support, the support having a porous structure and including a zeolite-type compound, the precursor material (A) being impregnated with the metal-containing solution; and a hydrothermal treatment step for hydrothermally treating, in the presence of a membrane comprising silica particles, a mixture of a structure-directing agent and a precursor material (C) obtained by calcining the precursor material (B).

Effects of the Invention

The present invention makes it possible to provide a functional structure which can resist a decrease in the functions of the functional material caused by influences such as force and heat and thus have a long life.

BRIEF DESCRIPTION OF THE DRAWINGS

FIGS. 1(a) and 1(b) are views schematically showing the inner structure of a functional structure according to an embodiment of the present invention, in which FIG. 1(a) is a perspective view (shown partially in transverse cross-sectional view), and FIG. 1(b) is a partially enlarged cross-sectional view.

FIGS. 2(a) and 2(b) are partially enlarged cross-sectional views for illustrating an example of the function of the functional structure shown in FIGS. 1(a) and 1(b), in which FIG. 2(a) is a view for illustrating a sieving function, and FIG. 2(b) is a view for illustrating a catalytic function.

PREFERRED MODE FOR CARRYING OUT THE INVENTION

Hereinafter, embodiments of the present invention will be described in detail regarding the drawings.

Configuration of Functional Structure

Figure 1A:
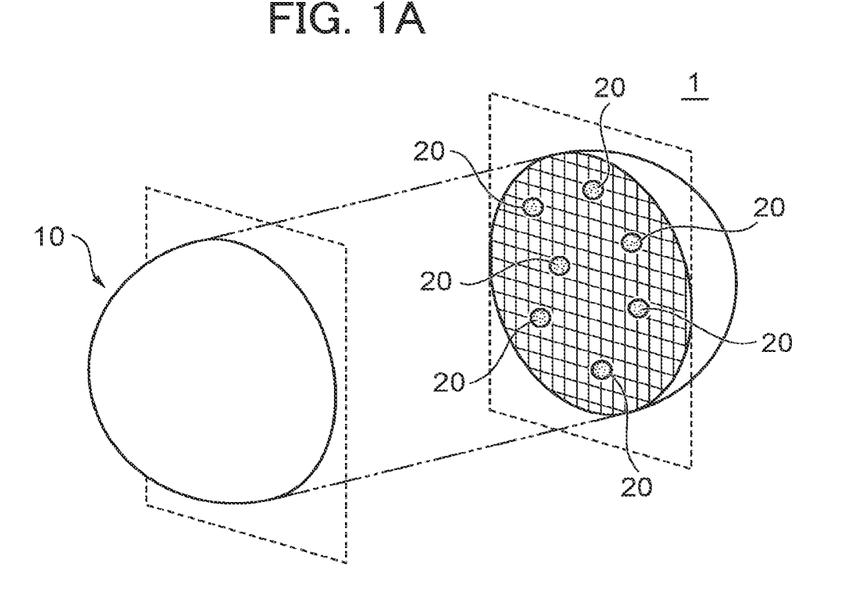
Figure 1B:
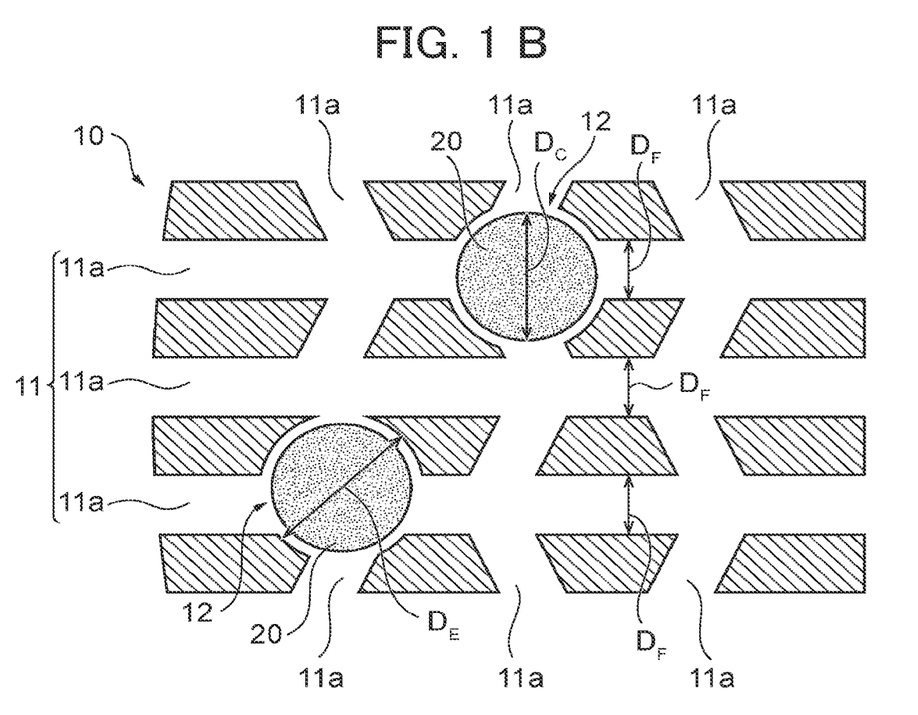

FIGS. 1(a) and 1(b) are views schematically showing the configuration of a functional structure according to an embodiment of the present invention, in which FIG. 1(a) is a perspective view (shown partially in transverse cross-sectional view), and FIG. 1(b) is a partially enlarged cross-sectional view. It should be noted that FIGS. 1(a) and 1(b) show only an example of the functional structure, and the configuration shown in FIGS. 1(a) and 1(b) such as shapes or dimensions are not intended to limit that of the present invention.

As shown in FIG. 1(a), a functional structure 1 includes frameworks 10 serving as supports each having a porous structure and including a zeolite-type compound, and at least one functional material 20 present in the frameworks 10.

The functional material 20 is a material that performs one or more functions alone or in cooperation with the framework 10. Examples of such a function include a catalytic function, a light emitting (fluorescence) function, a light absorbing function, and a discriminating function. The functional material 20 is preferably, for example, a catalytic material having a catalytic function. When the functional material 20 is a catalytic material, the framework 10 serves as a support that carries the catalytic material.

In the functional structure 1, a plurality of the functional material 20, 20, . . . are included in the porous structure of the framework 10. The catalytic material as an example of the functional material 20 is preferably in the form of at least one of a metal oxide fine particle and a metal fine particle. The metal oxide fine particle and the metal fine particle will be described later in detail. The functional material 20 may also be in the form of a particle including an oxide or an alloy of a certain metal or including a composite material of the oxide and the alloy.

The framework 10 has a porous structure, and as shown in FIG. 1(b), preferably has multiple pores 11a, 11a, . . . and channels 11 communicating with one another. The functional material 20 is present at least in the channel 11 of the framework 10 and is preferably held at least in the channel 11 of the framework 10.

Such a configuration restricts the movement of the functional material 20 in the framework 10 and effectively prevents aggregation of the functional materials 20, 20. This results in effective prevention of a decrease in the effective surface area of the functional material 20 and results in long-term retention of the function of the functional material 20. In other words, the functional structure 1 makes it possible to prevent a decrease in the function caused by aggregation of the functional materials 20, and to prolong the life of the functional structure 1. Moreover, due to the prolonged life of the functional structure 1, the frequency of replacement of the functional structure 1 can be reduced, and the amount of discarding of the used functional structure 1 can be greatly reduced, which leads to resource-saving.

In general, when the functional structure is used in a fluid (e.g., heavy oil, a reforming gas such as $NO_x$), the functional structure may receive an external force from the fluid. In such a case, if the functional material is held with only deposition state on the outer surface of the framework 10, there will be a problem in that, due to the influence of the external force from the fluid, the functional material can easily separate from the outer surface of the framework 10. On the other hand, in the functional structure 1, the functional material 20 is held at least in the channel 11 of the framework 10 and thus less likely to separate from the framework 10 even when receiving the influence of the external force from the fluid. Specifically, when the functional structure 1 is placed in the fluid, the fluid flowing into the channels 11 through the pores 11a of the framework 10 encounters flow channel resistance (frictional force), so that the velocity of the fluid flowing in the channel 11 would be lower than that of the fluid flowing on the outer surface of the framework 10. Due to the influence of such flow channel resistance, the pressure applied from the fluid onto the functional material 20 held in the channel 11 becomes lower than that applied from the fluid onto the functional material outside the framework 10. Therefore, the functional material 20 present in the framework 11 is effectively prevented from separating from the framework 11, and the function of the functional material 20 can be stably maintained for a long period of time. The flow channel resistance would be higher when the channel 11 of the framework 10 has multiple curves or branches and the interior of the framework 10 has a more complicated three-dimensional structure.

The content of the metal element (M) of the functional material is more than 2.5 mass % with respect to the mass of the functional structure 1. This feature allows the functional material to function more effectively. For example, when the functional material 20 has a catalytic function, the higher content of the metal element (M) leads to higher frequency of contact and collision between the starting material of the catalytic reaction and the functional material 20 inside the framework 10 so that the catalytic activity becomes high. Moreover, even when the content of the metal element (M) is high, the movement of the functional material 20 is restricted as mentioned above, which makes it possible to effectively prevent the aggregation of the functional materials 20, 20 and to stably maintain the function of the functional material 20 for a long period of time.

The content of the metal element (M) in the functional structure 1 is determined using inductively coupled plasma (ICP) alone or a combination of ICP and X-ray fluorescence (XRF) analysis. XRF analysis (energy dispersive X-ray fluorescence analyzer, SEA1200VX manufactured by SII Nanotechnology Inc.) is carried out in a vacuum atmosphere under conditions at an acceleration voltage of 15 kV (using a Cr filter) or an acceleration voltage of 50 kV (using a Pb filter).

The channels 11 preferably have any one of a one-dimensional pore, a two-dimensional pore, and a three-dimensional pore, which are defined by the framework structure of the zeolite-type compound, and preferably have an enlarged pore portion 12 different from the one-dimensional pore, the two-dimensional pore, and the three-dimensional pore. In this case, the functional material 20 is preferably present at least in the enlarged pore portion 12 and more preferably included at least in the enlarged pore portion 12. As used herein, the term "one-dimensional pore" or "one-dimensional pores" refers to a tunnel-type or cage-type pore that forms a one-dimensional channel or refers to multiple tunnel-type or cage-type pores (multiple one-dimensional channels) that form multiple one-dimensional channels. The term "two-dimensional pore" refers to a two-dimensional channel in which multiple one-dimensional channels are connected two-dimensionally. The term "three-dimensional pore" refers to a three-dimensional channel in which multiple one-dimensional channels are connected three-dimensionally.

According to this configuration, the movement of the functional material 20 is further restricted in the framework 10, and separation of the functional material 20 and aggregation of the functional materials 20, 20 are more effectively prevented. The state in which the functional material 20 is included in the porous structure of the framework 10 indicates that the functional material 20 is enclosed within the framework 10. In this regard, the functional material 20 and the framework 10 do not always have to be in direct contact with each other, and the functional material 20 may be indirectly held by the framework 10 with an additional material (e.g., a surfactant) provided between the functional material 20 and the framework 10.

FIG. 1(b) shows a case in which the functional material 20 is included in the enlarged pore portion 12. Such a configuration is non-limiting, and alternatively, the functional material 20 may be held in the channel 11 while partially protruding from the enlarged pore portion 12. Alternatively, the functional material 20 may be partially embedded in a portion of the channel 11 other than the enlarged pore portion 12 (e.g., an inner wall portion of the channel 11) or may be held by fixation or the like.

The enlarged pore portion 12 preferably connects a plurality of pores 11a, 11a constituting any one of the one-dimensional pore, the two-dimensional pore, and the three-dimensional pore. According to the configuration, another channel different from the one-dimensional pore, the two-dimensional pore, or the three-dimensional pore is provided in the framework 10 to exert the function of the functional material 20 more effectively.

The channel 11 preferably has a three-dimensional structure including a branching portion or a junction portion inside the framework 10, and the enlarged pore portion 12 is preferably provided at the branching portion or the junction portion of the channel 11.

The average inner diameter $D_F$ of the channels 11 provided in the framework 10 is calculated from the average of the short diameter and the long diameter of the pores 11a constituting any one of the one-dimensional pore, the two-dimensional pore, and the three-dimensional pore. The average inner diameter $D_F$ of the channels 11 is typically from 0.1 nm to 1.5 nm and preferably from 0.3 nm to 0.8 nm. The inner diameter $D_E$ of the enlarged pore portion 12 is typically from 0.5 nm to 50 nm, preferably from 1.1 nm to 40 nm, and more preferably from 1.1 nm to 3.3 nm. The inner diameter $D_E$ of the enlarged pore portion 12 depends, for example, on the pore size of the precursor material (A) described later and the average particle size $D_C$ of the functional material 20 to be included. The inner diameter $D_E$ of the enlarged pore portion 12 is such that it is possible to include the functional material 20.

The framework 10 includes a zeolite-type compound. Examples of the zeolite-type compound include silicate compounds such as zeolite (aluminosilicate), cation-exchanged zeolite and silicalite, zeolite analogue compounds such as aluminoborate, aluminoarsenate and germanate, and phosphate-based zeolite analogue materials such as molybdenum phosphate. Among them, the zeolite-type compound is preferably a silicate compound.

The framework structure of the zeolite-type compound may be selected from FAU type (Y type or X type), MTW type, MFI type (ZSM-5), FER type (ferrierite), LTA type (A type), MWW type (MCM-22), MOR type (mordenite), LTL type (L type), BEA type (beta type), and so on, and is preferably MFI type, and is more preferably ZSM-5. The zeolite-type compound has pores with a diameter (size) depending on the framework structure. For example, an MFI-type zeolite compound has a maximum pore size of 0.636 nm (6.36 Å) and an average pore size of 0.560 nm (5.60 Å).

Hereinafter, a detailed description will be provided of a case in which the functional material 20 is in the form of at least one of the metal oxide fine particle and the metal fine particle (hereinafter also generically referred to as "fine particle").

When the functional material 20 is in the form of a fine particle which may be a primary particle or a secondary particle resulting from the aggregation of the primary particles, the fine particle 20 preferably has an average particle size $D_C$ larger than the average inner diameter $D_F$ of the channels 11 and equal to or smaller than the inner diameter $D_E$ of the enlarged pore portion 12 ($D_F<D_C\leq D_E$). The fine particles 20 with such size are preferably included in the enlarged pore portions 12 in the channels 11, so that the movement of the fine particles 20 is restricted in the framework 10. Therefore, even when an external force is applied from a fluid to the fine particles 20, the movement of the fine particles 20 is suppressed in the framework 10, so that the fine particles 20, 20 . . . respectively included in the enlarged pore portions 12 dispersed in the channels 11 of the framework 10 are effectively prevented from coming into contact with one another.

In the form of either a primary particle or a secondary particle, the functional material 20 in the form of the metal oxide fine particle preferably has an average particle size $D_C$ of from 0.1 nm to 50 nm, more preferably 0.1 nm or more and less than 30 nm, even more preferably from 0.4 nm to 14.0 nm, and further more preferably from 1.0 nm to 3.3 nm. The ratio ($D_C/D_F$) of the average particle size $D_c$ of the metal oxide fine particles 20 to the average inner diameter $D_F$ of the channels 11 is preferably from 0.06 to 500, more preferably from 0.1 to 36, even more preferably from 1.1 to 36, and further more preferably from 1.7 to 4.5.

When the functional material 20 is in the form of the metal oxide fine particle, the content of the metal element (M) of the metal oxide fine particles in the functional structure 1 is preferably more than 2.5 mass % and 7.55 mass % or less, more preferably more than 2.5 mass % and 6.86 mass % or less, and even more preferably more than 3.4 mass % and 6.86 mass % or less, with respect to the mass of the functional structure 1. For example, when the metal element (M) is Co, the content (mass %) of the Co element is expressed by {(the mass of Co element)/(the mass of all elements in the functional structure 1)}×100.

The metal oxide fine particles only have to include a metal oxide. For example, the metal oxide fine particles may include a single metal oxide or a mixture of two or more metal oxides. The term "metal oxide" used herein to indicate the component (material) of the metal oxide fine particles is a generic term for an oxide or oxides containing at least one metal element (M), which is intended to include a metal oxide containing a single metal element (M) and a complex metal oxide containing two or more metal elements (M).

Examples of such a metal oxide include cobalt oxide ($CoO_x$), nickel oxide ($NiO_x$), iron oxide ($FeO_x$), copper oxide ($CuO_x$), zirconium oxide ($ZrO_x$), cerium oxide (CeO$_x$), aluminum oxide (AlO$_x$), niobium oxide (NbO$_x$), titanium oxide (TiO$_x$), bismuth oxide (BiO$_x$), molybdenum oxide (MoO$_x$), vanadium oxide (VO$_x$), and chromium oxide (CrO$_x$). The metal oxide fine particles are preferably composed mainly of one or more of oxides.

In the form of either a primary particle or a secondary particle, the functional material 20 in the form of the metal fine particle preferably has an average particle size $D_C$ of from 0.08 to 30 nm, more preferably 0.08 nm or more and less than 25 nm, even more preferably from 0.4 nm to 11.0 nm, and further more preferably from 0.8 nm to 2.7 nm. The ratio ($D_C/D_F$) of the average particle size $D_C$ of the metal fine particles 20 to the average inner diameter $D_F$ of the channels 11 is preferably from 0.05 to 300, more preferably from 0.1 to 30, even more preferably from 1.1 to 30, and further more preferably from 1.4 to 3.6.

When the functional material 20 is in the form of the metal fine particle, the content of the metal element (M) of the metal fine particles in the functional structure 1 is preferably more than 2.5 mass % and 7.55 mass % or less, more preferably more than 2.5 mass % and 6.86 mass % or less, and even more preferably more than 3.4 mass % and 6.86 mass % or less, with respect to the mass of the functional structure 1.

The metal fine particles only have to include metal which remains unoxidized. For example, the metal fine particles may include a single metal or an alloy or a mixture of two or more metals. When used herein to indicate the component (material) of the metal fine particle, the term "metal" is a generic term for a metallic material including one or more metal elements, which is intended to include an elementary metal including a single metal element (M) and an alloy or a mixture including two or more metal elements (M).

Examples of such metal include platinum (Pt), palladium (Pd), ruthenium (Ru), nickel (Ni), cobalt (Co), molybdenum (Mo), tungsten (W), iron (Fe), chromium (Cr), cerium (Ce), copper (Cu), magnesium (Mg), and aluminum (Al). The metal fine particles are preferably composed mainly of one or more of them.

In terms of durability, the functional material 20 is preferably in the form of the metal oxide fine particle.

The ratio (Si/M atomic ratio) of the number of silicon (Si) atoms in the framework 10 to the number of metal element (M) atoms in the fine particle 20 is preferably from 10 to 1000 and more preferably from 25 to 100. If the ratio is more than 1000, the effect of the functional material may not be a sufficient level, such as low activity. If the ratio is less than 10, the content of the fine particles 20 may be too high so that the strength of the framework 10 may tend to reduce. It should be noted that, the fine particles 20 described herein are the fine particles held or carried inside the framework 10 and are not intended to include the fine particles deposited on the outer surface of the framework 10.

Function of Functional Structure

As mentioned above, the functional structure 1 includes a framework 10 with a porous structure and at least one functional material 20 present in the framework 10. When the functional material 20 present in the framework of the functional structure 1 is brought into contact with a fluid, the function depending on the functional material 20 is exhibited. Specifically, a fluid coming into contact with the outer surface 10a of the functional structure 1 is allowed to flow into the interior of the framework 10 through a pore 11a formed at the outer surface 10a, then guided into the channels 11, and allowed to pass through the channels 11 and to flow out of the functional structure 1 through another pore 11a. When the functional material 20 held in the channel 11 comes into contact with the fluid passing through the channel 11, a reaction (e.g., catalytic reaction) depending on the function of the functional material 20 is caused. The functional structure 1 also has a molecular sieving ability since the framework has a porous structure.

Figure 2A:
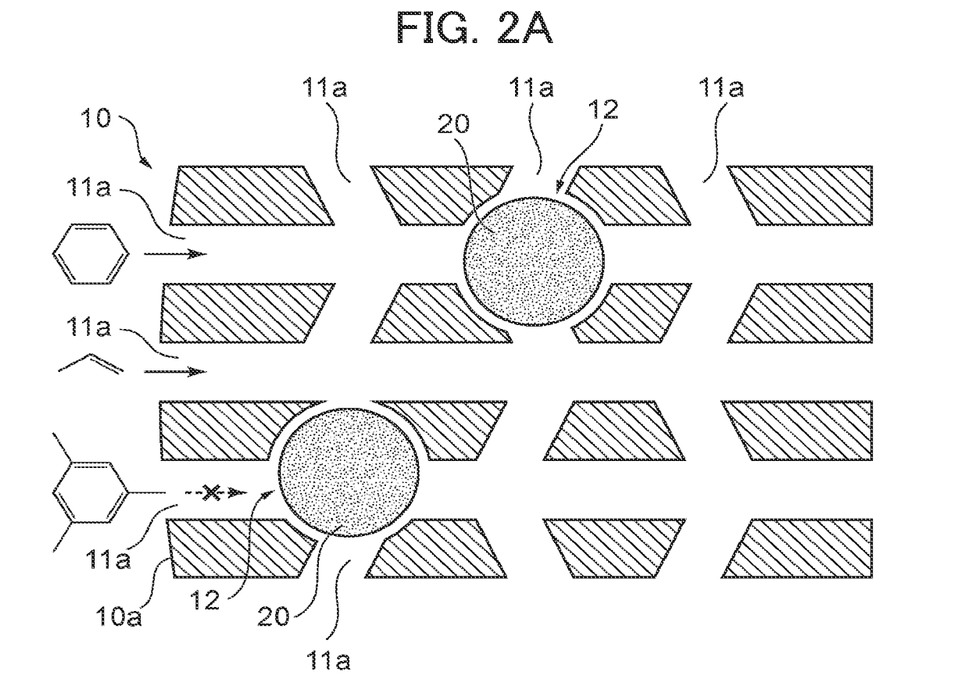

First, the molecular sieving ability of the functional structure 1 will be described with reference to FIG. 2(a) and an example in which the fluid is a liquid including benzene, propylene and mesitylene. As shown in FIG. 2(a), a compound (e.g., benzene or propylene) composed of molecule having size equal to or smaller than the diameter of the pore 11a, in other words, equal to or smaller than the inner diameter of the channel 11, can enter the framework 10. On the other hand, a compound (e.g., mesitylene) composed of molecule having size exceeding the diameter of the pore 11a cannot enter the framework 10. Accordingly, among multiple compounds in the fluid, some compounds not capable of entering the framework 10 are restricted from reacting, and some other compounds capable of entering the framework 10 are allowed to react.

Among compounds produced by reactions in the framework 10, only compound composed of molecule having size equal to or smaller than the diameter of the pore 11a can exit through the pore 11a to the exterior of the framework 10 to obtain as a reaction product. On the other hand, some compounds are not capable of exiting through the pore 11a to the exterior of the framework 10. If such compounds are converted into compounds composed of molecule having size that allow exit to the exterior of the framework 10, the compounds can exit to the exterior of the framework 10. As a result, the use of the functional structure 1 makes it possible to selectively obtain a specific reaction product.

Figure 2B:
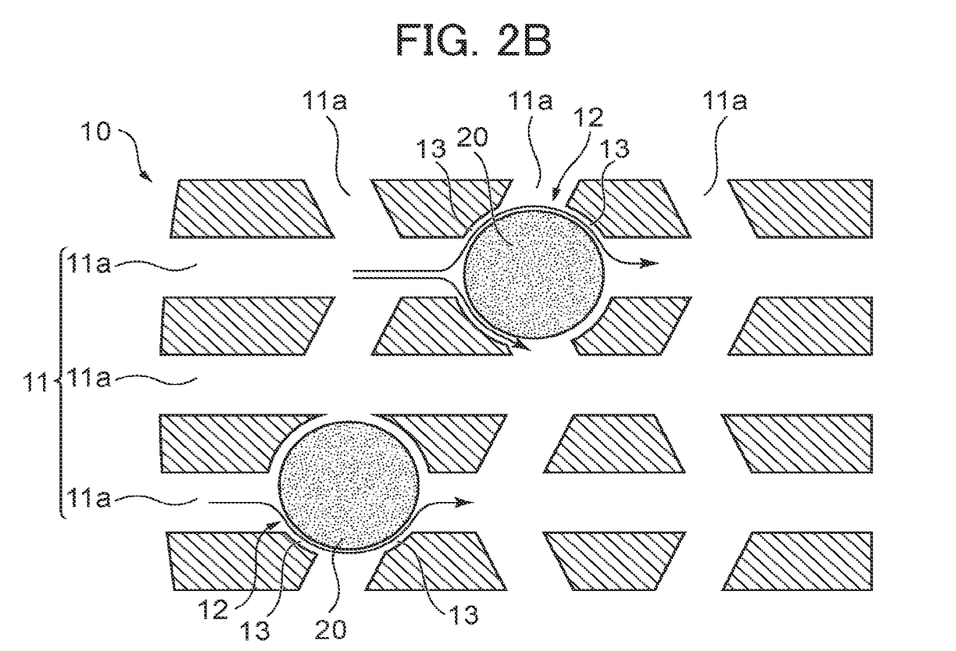

In the functional structure 1, the functional material 20 is preferably included in the enlarged pore portion 12 of the channel 11 as shown in FIG. 2(b). When the average particle size $D_C$ of the functional material 20 is larger than the average inner diameter $D_F$ of the channel 11 and smaller than the inner diameter $D_E$ of the enlarged pore portion 12 ($D_F<D_C<D_E$), a small channel 13 is provided between the functional material 20 and the enlarged pore portion 12. In this case, as indicated by the arrow in FIG. 2(b), the fluid entering the small channel 13 comes into contact with the functional material 20. Each functional material 20 included in the enlarged pore portion 12 is restricted from moving in the framework 10. Thus, the functional materials 20 are prevented from aggregating in the framework 10. As a result, a large contact area can be stably maintained between the functional materials 20 and the fluid.

Next, a description will be provided of a case in which the functional material 20 has a catalytic function. Specifically, for example, a description will be provided of an example in which the functional material 20 is in the form of the iron oxide (FeO$_x$) fine particle and dodecylbenzene as a component of heavy oil is allowed to enter the framework 10 of the functional structure 1. When dodecylbenzene enters into the framework 10, dodecylbenzene is converted by oxidative decomposition reaction into alcohols and ketones as shown below. Benzene that is a component of light oil is also produced from a ketone (acetophenone in this case) one of the decomposition products. This means that the functional material 20 functions as a catalyst for oxidative decomposition reaction. In this manner, heavy oil can be converted to light oil using the functional structure 1. In conventional art, the hydrogenolysis process using hydrogen is performed to convert heavy oil to light oil. In contrast, using the functional structure 1 eliminates the need for hydrogen. In places with difficulty in hydrogen supply, therefore, the functional structure 1 is useful to convert heavy oil to light oil. Elimination of the need for hydrogen can reduce the cost, which is expected to promote the use of heavy oil having not been in full use.

[Chem. 1]

[Chem. 2]

Next, a description will be provided of a case in which the functional material 20 has a catalytic function. Specifically, the functional material 20 may be in the form of the iron (Fe) fine particle. In this case, the functional structure 1 may be used, for example, as a catalyst for FT synthesis reaction. The FT synthesis reaction is a reaction using such a catalyst to synthesize the liquid hydrocarbon from carbon monoxide and hydrogen, which is generally expressed by the following formula.

First Mode of Method of Producing Functional Structure

Figure 3:
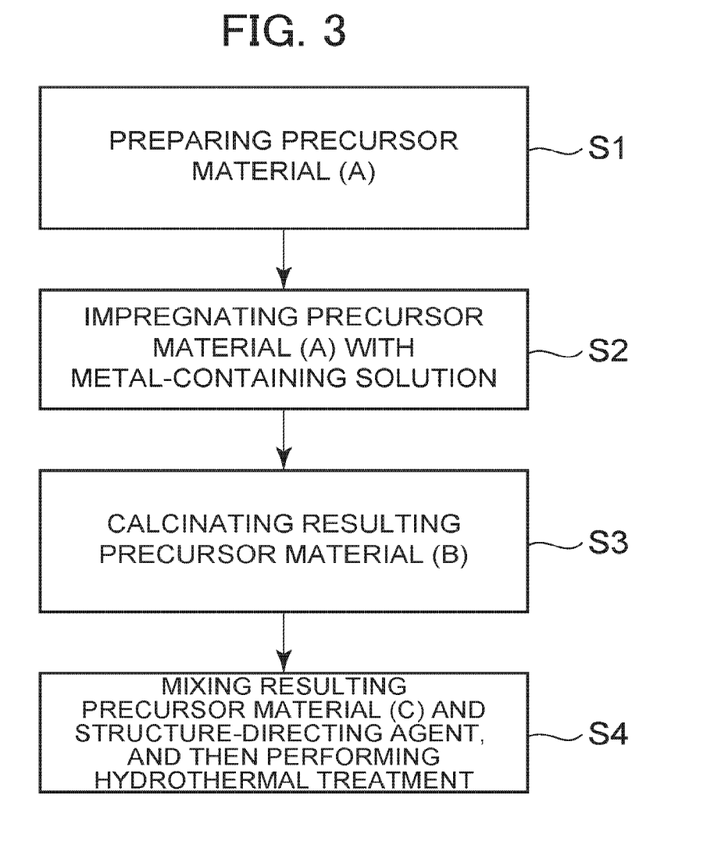
FIG. 3 is a flowchart showing an example of a method for producing the functional structure of FIGS. 1(a) and 1(b).

FIG. 3 is a flowchart showing a method of producing the functional structure 1 of FIGS. 1(a) and 1(b). Hereinafter, an example of the method for producing the functional structure containing the functional material in the form of the metal oxide fine particle present in the framework will be described.

Step S1: Preparation Step

As shown in FIG. 3, first, a precursor material (A) for obtaining a framework having a porous structure and including a zeolite-type compound is prepared. The precursor material (A) is preferably a regular mesoporous material, and may be appropriately selected depending on the type (composition) of the zeolite-type compound constituting the framework of the functional structure.

When the zeolite-type compound constituting the framework of the functional structure is a silicate compound, the regular mesoporous material is preferably a compound having a Si—O skeleton having pores with a pore size of from 1 to 50 nm uniformly and regularly developed one-dimensionally, two-dimensionally, or three-dimensionally. Such a regular mesoporous material is obtained as a variety of synthetic products depending on the synthesis conditions. Examples of such synthetic products include SBA-1, SBA-15, SBA-16, KIT-6, FSM-16, and MCM-41. In particular, MCM-41 is preferred. For reference, SBA-1 has a pore size of from 10 to 30 nm, SBA-15 has a pore size of from 6 to 10 nm, SBA-16 has a pore size of 6 nm, KIT-6 has a pore size of 9 nm, FSM-16 has a pore size of from 3 to 5 nm, and MCM-41 has a pore size of from 1 to 10 nm. Examples of such a regular mesoporous material include mesoporous silica, mesoporous aluminosilicate, and mesoporous metallosilicate.

The precursor material (A) may be a commercially available product or a synthetic product. The precursor material (A) may be synthesized using a known method for synthesizing a regular mesoporous material. For example, a mixture solution which contains a raw material containing constituent element of the precursor material (A) and a casting agent for controlling the structure of the precursor material (A) is prepared, the pH of the mixture solution is optionally adjusted, and the mixture solution is subjected to hydrothermal treatment (hydrothermal synthesis). Subsequently, the precipitate (product) resulting from the hydrothermal treatment is collected (e.g., filtered off), washed and dried if necessary, and then calcinated to obtain a precursor material (A) as a powdery regular mesoporous material. In this process, the solvent for the mixture solution may be, for example, water, an organic solvent such as alcohol, or a mixed solvent thereof. The raw material may be selected depending on the type of the framework. Examples of the raw material include silica agents such as tetraethoxysilane (TEOS), fumed silica, and quartz sand. The casting agent may be any of various surfactants and block copolymers. Various types of surfactants, block copolymers, and the like can be used as the casting agent. The casting agent is preferably selected depending on the type of the regular mesoporous material to be synthesized. For example, MCM-41 is produced, a surfactant such as hexadecyltrimethylammonium bromide is preferable. The hydrothermal treatment may be performed, for example, in a sealed vessel under conditions at from 80 to 800° C. and from 0 to 2000 kPa for from 5 hours to 240 hours. The calcining treatment may be performed, for example, in the air under conditions at from 350 to 850° C. for from 2 to 30 hours.

Step S2: Impregnation Step

Next, the prepared precursor material (A) is impregnated with a metal-containing solution to form a precursor material (B).

The metal-containing solution may be any solution containing a metal component (e.g., a metal ion) corresponding to the metal element (M) constituting the metal oxide fine particle of the functional structure. For example, the metal-containing solution may be prepared by dissolving, in a solvent, a metal salt containing the metal element (M). Examples of such a metal salt include chlorides, hydroxides, oxides, sulfates, and nitrates, among which nitrates are preferred. The solvent may be, for example, water, an organic solvent such as alcohol, or a mixed solvent thereof.

Any method may be used to impregnate the precursor material (A) with the metal-containing solution. For example, before the calcination step described later, the impregnation is preferably performed by adding the metal-containing solution little by little in multiple portions to the powdery precursor material (A) being stirred. In order to allow the metal-containing solution to more easily enter into the pores of the precursor material (A), a surfactant is preferably added as an additive in advance before the addition of the metal-containing solution. Such an additive can act to cover the outer surface of the precursor material (A) and thus to inhibit the adhesion of the metal-containing solution on the outer surface of the precursor material (A), so that the metal-containing solution subsequently could easily enter into the pores of the precursor material (A).

Examples of such an additive include nonionic surfactants such as polyoxyethylene oleyl ether, polyoxyethylene alkyl ether, and polyoxyethylene alkyl phenyl ether. These surfactants have a large molecular size and thus cannot enter into the pores of the precursor material (A), which suggests that the surfactants will not adhere to the interior of the pores and will not hinder the entering the metal-containing solution into the pores. A method of adding the nonionic surfactant preferably includes, for example, adding from 50 to 500 mass % of the nonionic surfactant to the precursor material (A) before the calcination step described later. If the addition amount of the nonionic surfactant to the precursor material (A) is less than 50 mass %, the inhibiting effect may be difficult to achieve, and if the addition amount of the nonionic surfactant to the precursor material (A) is more than 500 mass %, undesirably high viscosity may be reached. Therefore, the addition amount of the nonionic surfactant to the precursor material (A) is set to a value within the above range.

Preferably, the addition amount of the metal-containing solution added to the precursor material (A) is appropriately adjusted in view of the amount of the metal element (M) contained in the metal-containing solution with which the precursor material (A) is to be impregnated (in other words, the amount of the metal element (M) to be present in the precursor material (B)). Before the calcination step described later, for example, the addition amount of the metal-containing solution added to the precursor material (A) is preferably adjusted such that the ratio (Si/M atomic ratio) of the number of silicon (Si) atoms in the precursor material (A) to the number of the metal element (M) atoms contained in the metal-containing solution is set to from 10 to 1000 and more preferably from 25 to 100. For example, when a surfactant is added as an additive to the precursor material (A) before the addition of the metal-containing solution to the precursor material (A), the addition amount of the metal-containing solution added to the precursor material (A) may be adjusted such that the calculated Si/M atomic ratio can be from 25 to 100. In such a case, the content of the metal element (M) of the metal oxide fine particles can be adjusted more than 2.5 mass % based on the functional structure. In the state of the precursor material (B), the content of the metal element (M) present within the porous is generally proportional to the addition amount of the metal-containing solution added to the precursor material (A) as long as the metal concentration of the metal-containing solution, the presence or absence of the additive, and other conditions such as temperature and pressure remain constant. The amount of the metal element (M) present in the precursor material (B) is also proportional to the amount of the metal element constituting the metal oxide fine particles present in the framework of the functional structure. Accordingly, when the addition amount of the metal-containing solution added to the precursor material (A) is controlled within the above range, the pores of the precursor material (A) can be sufficiently impregnated with the metal-containing solution, which makes it possible to adjust the content of the metal oxide fine particles present in the framework of the functional structure.

After the precursor material (A) is impregnated with the metal-containing solution, washing treatment may be performed if necessary. The washing liquid used may be water, an organic solvent such as alcohol, or a mixed solution thereof. Drying treatment is also preferably performed after the impregnation of the precursor material (A) with the metal-containing solution and then optionally after the washing treatment. The drying treatment may include natural drying overnight or so or drying at a high temperature of 150° C. or less. The drying is preferably performed thoroughly because the framework structure of the precursor material (A) as the regular mesoporous material may collapse if the calcination treatment described later is performed while a large amount of water contained in the metal-containing solution or in the washing liquid remains in the precursor material (A).

Step S3: Calcination Step

Next, the precursor material (B) is calcinated to form a precursor material (C). The precursor material (B) is a product obtained through impregnating, with the metal-containing solution, the precursor material (A) for forming the framework having a porous structure and including the zeolite-type compound.

The calcining is preferably carried out, for example, in the air under conditions at from 350 to 850° C. for 2 to 30 hours. Such calcination treatment allows the growth of crystals of the metal component entering into the pores for the regular mesoporous material, so that the metal oxide fine particles are formed in the pores.

Step S4: Hydrothermal Treatment Step

Then, a mixture solution of the precursor material (C) and a structure-directing agent is prepared, and the precursor material (C) obtained by calcining the precursor material (B) is subjected to hydrothermal treatment to obtain a functional structure.

The structure-directing agent is a casting agent for directing the framework structure of the framework of the functional structure. The structure-directing agent may be, for example, a surfactant. The structure-directing agent is preferably selected depending on the framework structure of the framework of the functional structure, and preferred examples thereof include a surfactant such as tetramethylammonium bromide (TMABr), tetraethylammonium bromide (TEABr), tetrapropylammonium bromide (TPABr). These agents are generally referred to as organic structure-directing agent (OSDA).

The precursor material (C) and the structure-directing agent may be mixed during or before the hydrothermal treatment step. Any method may be used to prepare the mixture solution. The precursor material (C), the structure-directing agent, and the solvent may be mixed at the same time, or the precursor material (C) and the structure-directing agent may be separately dispersed into individual solvents and then the resulting dispersion solutions may be mixed. The solvent may be, for example, water, an organic solvent such as alcohol, or a mixed solvent thereof. Before the hydrothermal treatment, the mixture solution is preferably subjected to pH adjustment using an acid or a base.

If the rate of hydrolysis of the precursor material (C) is too high, the metal oxide fine particles may flow out from the inside of the precursor material (C) and thus may hardly be included in the zeolite. If the hydrolysis rate is too low, the zeolite may be difficult to form. Thus, the hydrolysis rate should be adjusted to an appropriate level depending on the amount of metal to be included. The hydrolysis rate may be adjusted by one or any combination of adjusting the temperature during the synthesis, adjusting the pH of the solution subjected to the synthesis, and extending the reaction time.

The hydrothermal treatment may be carried out using a known method in consideration of the above factors, for example, which is preferably performed in a sealed vessel under conditions at from 80 to 800° C. and from 0 to 2000 kPa for 5 hours to 240 hours. The hydrothermal treatment is also preferably performed in a basic atmosphere.

Although the reaction mechanism is not necessarily clear, the hydrothermal treatment using the precursor material (C) as a raw material can gradually destroy the framework structure of the precursor material (C) as the regular mesoporous material but can form a new framework structure (porous structure) for the framework of the functional structure due to the action of the structure-directing agent while the position of the metal oxide fine particles in the pores of the precursor material (C) substantially remains. The resulting functional structure includes a framework of a porous structure and metal oxide fine particles present in the framework, in which the framework has channels connecting multiple pores derived from the porous structure, and at least some of the metal oxide fine particles are held in the channel of the framework.

In the embodiment of the hydrothermal treatment step, the mixture solution of the precursor material (C) and the structure-directing agent is prepared, and then the precursor material (C) is subjected to hydrothermal treatment. However, the hydrothermal treatment step is non-limited, the precursor material (C) may be hydrothermally treated without being mixed with the structure-directing agent and the precursor material (C).

Preferably, the precipitate (functional structure) resulting from the hydrothermal treatment is collected (e.g., filtered off) and then optionally washed, dried, and calcinated. The washing liquid may be water, an organic solvent such as alcohol, or a mixed solution thereof. The drying treatment may include natural drying overnight or so or drying at a high temperature of 150° C. or less. The drying is preferably performed thoroughly because the framework structure of the functional structure as the framework may collapse if the calcination treatment is performed while a large amount of water remains in the precipitate. The calcination treatment may be performed, for example, in the air under conditions at from 350 to 850° C. for 2 to 30 hours. During such calcination treatment, the structure-directing agent is burned away from the functional structure. Depending on the intended use, the functional structure may be used as it is without undergoing the calcination treatment of the collected precipitate. For example, when the functional structure is used in a high-temperature oxidative atmosphere environment, the structure-directing agent will be burned away by exposing the functional structure to the usage environment for a certain period of time. In such a case, the resulting functional structure can be used without any modification since such a functional structure is substantially the same as that obtained after the calcination treatment.

Second Mode of Method of Producing Functional Structure

According to the present invention, a second mode of a method of producing the functional structure is provided, which includes a calcination step for calcining a precursor material (B) including a metal-containing solution and a precursor material (A) for forming a support, the support having a porous structure and including a zeolite-type compound, the precursor material (A) being impregnated with the metal-containing solution, and a hydrothermal treatment step for hydrothermally treating, in the presence of a membrane including silica particles, a mixture of a structure-directing agent and a precursor material (C) obtained by calcining the precursor material (B).

The first mode and the second mode of method of producing the functional structure according to the present invention may only differ in that, before the calcination step, the impregnation step may include adjusting the addition amount of the metal-containing solution added to the precursor material (A) such that the ratio (Si/M atomic ratio) of the number of silicon (Si) atoms in the precursor material (A) to the number of the metal element (M) atoms contained in the metal-containing solution is set to from 10 to 1000, and that the hydrothermal treatment is performed in the presence of the membrane including the silica particles.

During such hydrothermal treatment in the presence of the membrane including the silica particles, the raw material silicon of the hydrothermal treatment is partially consumed to grow the silica particles under the hydrothermal condition, so that the content of the metal element (M) increases relatively.

The silica membrane may be attached to the inner wall of the vessel (e.g., an autoclave) for the hydrothermal treatment, may be attached to a base plate hardly soluble under the hydrothermal condition and then added to the mixture solution, or may be directly added to the mixture solution if the membrane has sufficient strength. The thickness of the silica membrane is preferably, but not limited to, from 0.1 µm to 1.0 µm. If the silica membrane has a thickness of less than 0.1 µm, the amount of silicon consumed to grow the silica particles is small, and hence a sufficient amount of the silica source may fail to be consumed in the growth of the silica membrane. If the silica membrane has a thickness of more than 1.0 µm, it may take a lot of time to form the silica membrane.

While an example of the method of producing a functional structure including the metal oxide fine particle as the functional material has been described, a functional structure including the metal fine particle as the functional material can also be produced in an almost similar manner. For example, a functional structure including a framework and the metal fine particles in the framework can be obtained by a process that includes obtaining, as shown above, the functional structure including the metal oxide fine particles and then reducing the obtained functional structure in a reducing gas atmosphere such as hydrogen gas. In this case, the metal oxide fine particles present in the framework are reduced into the metal fine particles which correspond to the metal element (M) of the metal oxide fine particles. Alternatively, an oxidation-resistant metal species (e.g., noble metal) may be used as the metal element (M) contained in the metal-containing solution with which the precursor material (A) is to be impregnated. In this case, the calcination step (step S3) allows crystal growth to form the metal fine particles, which may be followed by hydrothermal treatment to form a functional structure including a framework and the metal fine particles present in the framework.

Figure 4:
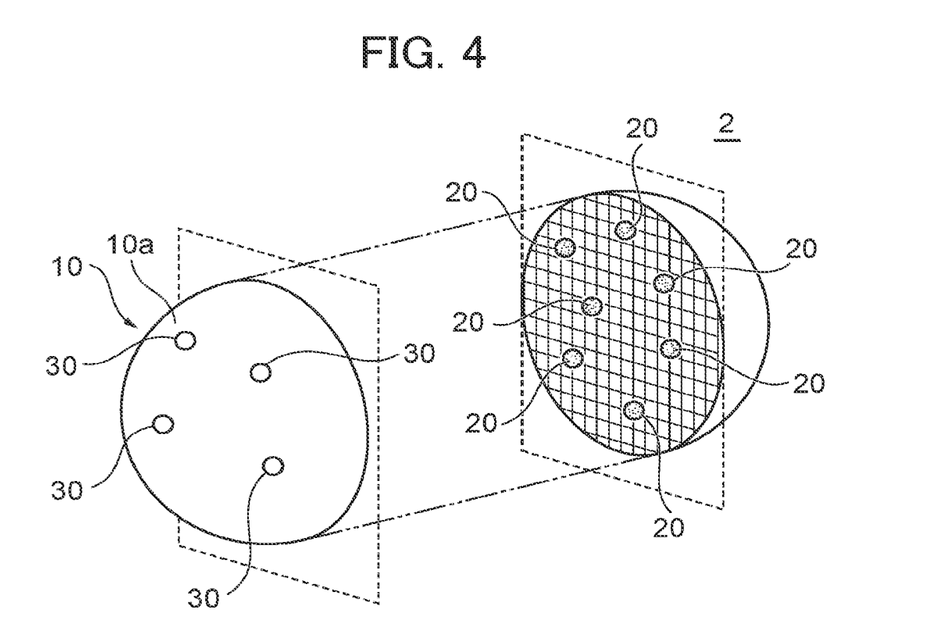
FIG. 4 is a schematic view showing a modification of the functional structure of FIGS. 1(a) and 1(b).

Modifications of Functional structure 1 FIG. 4 is a schematic view showing a modification of the functional structure 1 of FIGS. 1(a) and 1(b). The functional structure 1 shown in FIGS. 1(a) and 1(b) includes the framework 10 and the functional material 20 present in the framework 10. Such a structure is non-limiting, and, as shown in FIG. 4, for example, a functional structure 2 may further include an additional functional material 30 held on an outer surface 10a of the framework 10.

The functional material 30 can perform one or more functions. The function of the additional functional material 30 may be the same as or different from that of the functional material 20. Examples of the function of the additional functional material 30 may be the same as that of the functional material 20. In particular, the additional functional material 30 is preferably a catalytic material having a catalytic function. When both of the functional materials 20 and 30 have the same function, a material of the additional functional material 30 may be the same as or different from that of the functional material 20. According to the configuration, the content of the functional material held on the functional structure 2 can be increased, which further enhances the function of the functional material.

In this case, the content of the functional material 20 present in the framework 10 is preferably higher than the content of the additional functional material 30 held on the outer surface 10a of the framework 10. In such a case, the function of the functional material 20 held inside the framework 10 can be dominant, and the function of the functional materials can be stably exhibited.

While the functional structures according to embodiments of the present invention have been described, it will be understood that the embodiments are not intended to limit the present invention and may be altered or modified in various ways based on the technical idea of the present invention.

EXAMPLES

Examples 1 to 4

Synthesis of Precursor Material (A)

An aqueous solution of a mixture of a silica agent (tetraethoxysilane (TEOS) manufactured by Wako Pure Chemical Industries, Ltd.) and a surfactant as a casting agent was prepared, then subjected to pH adjustment as needed, and then hydrothermally treated in a sealed vessel at from 80 to 350° C. for 100 hours. Subsequently, the produced precipitate was filtered off, then washed with water and ethanol, and then calcinated in the air at 550° C. for 24 hours to obtain a precursor material (A) of the type and pore size shown in Table 1. The following surfactant was used according to the type of the precursor material (A) ("Type of precursor material (A): surfactant").

MCM-41: Hexadecyltrimethylammonium bromide (CTAB) (manufactured by Wako Pure Chemical Industries, Ltd.)

Preparation of Precursor Materials (B) and (C)

Next, depending on the type of the metal element (M) constituting the metal oxide fine particles shown in Table 1, a metal salt containing the metal element (M) was dissolved in water to prepare a metal-containing aqueous solution. The following metal salt was used according to the type of the metal oxide fine particles ("Metal oxide fine particle: metal salt").

$CoO_x$: Cobalt nitrate (II) hexahydrate (manufactured by Wako Pure Chemical Industries, Ltd.)

$NiO_x$: Nickel nitrate (II) hexahydrate (manufactured by Wako Pure Chemical Industries, Ltd.)

Subsequently, the metal-containing aqueous solution was added little by little in multiple portions to the powdery precursor material (A), and the resulting product was then dried at room temperature (20° C.±10° C.) for at least 12 hours to obtain the precursor material (B).

It should be noted that, regarding the presence or absence of an additive shown in Table 1, when the additive was "present", the followings were performed. Pretreatment was performed in which an aqueous solution of polyoxyethylene (15) oleyl ether (NIKKOL BO-15V, manufactured by Nikko Chemicals Co., Ltd.) as an additive was added to the precursor material (A) before the addition of the metal-containing aqueous solution, and then the metal-containing aqueous solution was added as shown above to the resulting product. Regarding the presence or absence of the additive, when the additive was "absence", the pretreatment with the additive was not performed.

The addition amount of the metal-containing aqueous solution added to the precursor material (A) was adjusted such that the calculated ratio (Si/M atomic ratio) of the silicon (Si) content of the precursor material (A) to the metal element (M) content of the metal-containing aqueous solution was as shown in Table 1.

Subsequently, the resulting precursor material (B) impregnated with the metal-containing aqueous solution was calcinated in the air at 550° C. for 24 hours to obtain the precursor material (C).

Synthesis of Functional Structure

An aqueous solution of a mixture of the resulting precursor material (C) and the structure-directing agent was prepared and then hydrothermally treated in a sealed vessel at from 80 to 350° C. under the pH and time conditions shown in Table 1. In Example 3, the synthesis was carried out under the condition in which the silica particles are deposited with a thickness of from 0.1 to 0.2 mm on the inner wall of the sealed vessel. Subsequently, the produced precipitate was filtered off, then washed with water, then dried at 100° C. for at least 12 hours, and then calcinated in the air at 600° C. for 24 hours to obtain the functional structure including the framework and the metal oxide fine particles as the functional material as shown in Table 1 (Examples 1 to 4).

Comparative Example 1

In Comparative Example 1, MFI type silicalite (functional structure C1) was synthesized in the same manner as in Example 1 except that the step of depositing the cobalt oxide fine particles was omitted.

Comparative Example 2

In Comparative Example 2, MFI type silicalite was mixed with cobalt oxide powder with an average particle size equal to or less than 50 nm (II, III manufactured by Sigma-Aldrich Japan), so that a functional structure C2, in which the cobalt oxide fine particles as a functional material are deposited on the outer surface of the silicalite as a framework, was obtained. The MFI type silicalite was synthesized in the same manner as in Comparative Example 1.

Comparative Example 3

In Comparative Example 3, a functional structure C3 was synthesized in the same manner as in Example 1, except that the ratio (Si/M atomic ratio) of the number of silicon (Si) atoms in the precursor material (A) to the number of the metal element (M) atoms was 100.

Evaluation

The functional structures of the examples and the functional structures C1 to C3 of the comparative examples were evaluated for the various characteristics under the conditions shown below.

(A) Cross-Sectional Observation

Samples for observation were prepared by pulverization treatment from the functional structures of the examples and the functional structures C1 to C3 of the comparative examples. The cross-section of each sample was observed using a transmission electron microscope (TEM) (TITAN G2 manufactured by FEI Company).

As a result, in the functional structure of each of the examples and in the functional structure C3, the functional material was found to be present and held inside the framework composed of zeolite. On the other hand, no functional material was found in the functional structure C1 of Comparative Example 1. In the functional structure C2 of Comparative Example 2, the functional material was found to be deposited only on the outer surface of the framework and not found present in the framework.

Among the functional structures of the examples and Comparative Example 3, the functional structure containing the cobalt oxide fine particles ($CoO_x$) as a metal oxide was subjected to cross-section cutting by use of focused ion beam (FIB) processing. The resulting cross-section was subjected to elemental analysis by use of SEM (SU8020 manufactured by Hitachi High Technologies Co., Ltd.) and energy dispersive X-ray spectroscopy (EDX) (X-Max manufactured by Horiba, Ltd.). As a result, Co element was detected from the inside of the framework.

The results of the cross-sectional observation by use of TEM and SEM/EDX revealed the existence of the cobalt oxide fine particles inside the framework.

(B) Average Inner Diameter of Channels of Framework and Average Particle Size of Functional Material Any 500 channels of the framework were selected in the TEM image taken during the cross-sectional observation performed for the above evaluation (A). The long diameter and the short diameter of each of the channels were measured. The measured values were averaged to calculate the inner diameter of each channel (N=500), and the calculated inner diameters were averaged as the average inner diameter $D_F$ of the channels of the framework. In a similar manner, any 500 functional materials were also selected in the TEM image and the particle size of each of the functional materials were measured (N=500). The measured values were averaged to determine the average particle size $D_C$ of the functional material. Table 1 shows the results.

Small angle X-ray scattering (SAXS) analysis was also performed to confirm the average particle size and the dispersed state of the functional material. The SAXS measurement was carried out using the beamline BL19B2 of Spring-8. The resulting SAXS data were subjected to fitting by Guinier approximation method using a spherical model to determine the particle size. The particle size measurement was performed on the functional structures including the cobalt oxide fine particles as a metal oxide. For comparison, commercially available cobalt oxide fine particles (manufactured by Wako) were observed and measured using SEM.

The results were as follows. In the commercially available product, the cobalt oxide fine particles were found at random with different particle sizes in the range of about 50 nm to 400 nm. On the other hand, in the functional structure of each of the examples, the scattering peak was detected, which corresponds to the value shown in Table 1 for each example with a particle size of 10 nm or less. The results of the SAXS measurement revealed that the functional materials had a narrow range of particle sizes of 10 nm or less and were extremely highly dispersed inside the framework.

(C) Relationship Between the Addition Amount of Metal-Containing Solution and the Metal Content Functional structures having the metal oxide fine particles included inside the framework were prepared with an additional amount corresponding to an Si/M atomic ratio of 50 (M=Co). Subsequently, the functional structures prepared with the addition amount were measured for the content (mass %) of metal included in the framework. The method for quantitatively determining the metal content was performed using inductively coupled plasma (ICP) or a combination of ICP and X-ray fluorescence (XRF) analysis. XRF analysis (using energy dispersive X-ray fluorescence analyzer SEA1200VX manufactured by SII Nanotechnology Inc.) was carried out in a vacuum atmosphere under conditions at an acceleration voltage of 15 kV (using a Cr filter) or an acceleration voltage of 50 kV (using a Pb filter).

XRF is a method for determining the metal content by the fluorescence intensity, and XRF alone cannot quantitatively determine the metal content (in units of mass %). Therefore, the content of metal in the functional structure containing metal in such an amount that the Si/M atomic ratio was 100 was used as a standard sample, ICP analysis was used to quantify. The content of the cobalt element was 1.3 mass % (Comparative Example 3). The functional structure of the examples was subjected to XRF measurement, and the metal content was calculated using the following equation.

The metal content (wt %) of the functional structure=the ICP measurement value (wt %) of the standard sample×(the XRF count value (cps) of the functional structure/the XRF count value (cps) of the standard sample)

As a result, it has been found that the conversion rate by FT synthesis reaction tends to increase with increasing the metal content.

(D) The Content of Metal Element (M) in Functional Structure

The method for quantitatively determining the metal content was performed using inductively coupled plasma (ICP) alone or a combination of ICP and X-ray fluorescence (XRF) analysis. XRF analysis (using energy dispersive X-ray fluorescence analyzer SEA1200VX manufactured by SII Nanotechnology Inc.) was carried out in a vacuum atmosphere under conditions at an acceleration voltage of 15 kV (using a Cr filter) or an acceleration voltage of 50 kV (using a Pb filter).

(E) Performance Evaluation

The functional structures of the examples and the functional structures C1 to C3 of the comparative examples were evaluated for the catalytic ability (performance) of the functional material (catalytic material). Table 1 shows the results.

(1) Catalytic Activity

Catalytic activity was evaluated under the conditions shown below. First, an atmospheric pressure flow reactor was filled with 70 mg of the catalyst structures. While hydrogen (8 mL/min) and carbon monoxide (4 mL/min) were supplied to the reactor, FT synthesis reaction was carried out with heating from 100 to 700° C. at 0.1 MPa for 1 hour. The used atmospheric pressure flow reactor was a single microreactor (Rx-3050SR available from Frontier Laboratory).

After the completion of the reaction, the generated gas and the generated liquid that were collected were subjected to component analysis using gas chromatography-mass spectrometry (GC/MS). As the analysis apparatus, TRACE 1310GC (manufactured by Thermo Fisher Scientific Inc., detector: thermal conductivity detector) was used.

Based on the results of the analysis, the basis gas (CO) conversion rate at 250° C. was calculated. A basis gas conversion rate of 9% or more was evaluated as good catalytic activity (o) for FT synthesis reaction, a basis gas conversion rate of 3% or more and less than 9% was evaluated as not good but acceptable catalytic activity (a), and a basis gas conversion rate of less than 3% was evaluated as poor (unacceptable) catalytic activity (x).

Table 1 shows that the catalyst structures (Examples 1 to 4), found to hold the catalytic material inside the support (framework) in the cross-sectional observation, have higher catalytic activity for FT synthesis reaction than the catalyst structure (Comparative Example 1) composed only of the support (framework) and the catalyst structure (Comparative Example 2) having the catalytic material only deposited on the outer surface of the support (framework).

The catalyst structures (Examples 1 to 4), which were found in the evaluation (D) that the content of the metal element (M) of the metal fine particles was more than 2.5 mass %, have been found to have higher catalytic activity for FT synthesis reaction than the catalyst structure (Comparative Example 3) in which the content of the metal element (M) of the metal oxide fine particles was 1.3 mass %. It was found out that the catalytic activity for FT synthesis reaction tends to increase when the content of the metal element (M) of the metal oxide fine particles is from 2.6 to 6.9 mass %, which is more than 2.5 mass %.

TABLE 1

| | Conditions for production of functional structure | | | | | | |
|---|---|---|---|---|---|---|---|
| | Precursor material (A) | | Addition to precursor material (A) | Calculated ratio (atomic ratio) | Conditions for hydrothermal treatment using precursor material (C) | | |
| No. | Type | Pore size (nm) | Presence or absence of additive | for addition amount of metal-containing solution Si/M | Presence or absence of silica membrane | Type of structure-directing agent | pH of solution for synthesis | Time (h) |
| Example 1 | MCM-41 | 2.5 | Present | 50 | Absent | TPABr | 11 | 80 |
| Example 2 | MCM-41 | 2.5 | Present | 50 | Absent | TPABr | 11 | 85 |
| Example 3 | MCM-41 | 2.5 | Present | 100 | Present | TPABr | 12 | 72 |
| Example 4 | MCM-41 | 2.5 | Present | 25 | Absent | TPABr | 11 | 90 |
| Comparative Example 1 | MCM-41 | 2.5 | Absent | 0 | Absent | TPABr | 12 | 72 |
| Comparative Example 2 | MCM-41 | 2.5 | Absent | 0 | Absent | TPABr | 12 | 72 |
| Comparative Example 3 | MCM-41 | 2.5 | Present | 100 | Absent | TPABr | 12 | 72 |

| | Functional structure | | | | | | Performance |
|---|---|---|---|---|---|---|---|
| | Framework Zeolite-type compound | | Functional material Metal oxide fine particle | | Content of metal | | Evaluation (FT synthesis |
| No. | Structure | Average inner diameter $D_F$ of channels (nm) | Type | Average particle size $D_C$ (nm) | element (M) [wt %] | $D_C/D_F$ | reaction conversion rate) |
| Example 1 | MFI | 0.56 | CoOx | 2.5 | 2.6 | 4.6 | ○ |
| Example 2 | MFI | 0.56 | CoOx | 2.5 | 3.4 | 6.1 | ○ |
| Example 3 | MFI | 0.56 | NiOx | 2.5 | 3.1 | 5.5 | ○ |
| Example 4 | MFI | 0.56 | CoOx | 2.5 | 6.9 | 12.3 | ○ |
| Comparative Example 1 | MFI | 0.56 | Absent | — | — | — | × |
| Comparative Example 2 | MFI | 0.56 | CoOx | — | — | ≤67.6 | × |
| Comparative Example 3 | MFI | 0.56 | CoOx | 2.5 | 13 | 2.3 | Δ |

EXPLANATION OF REFERENCE NUMERALS

1: Functional structure
10: Support (or framework)
10a: Outer surface
11: Channel
11a: Pore
12: Enlarged pore portion
20: Functional material
30: Functional material
$D_C$: Average particle size
$D_F$: Average inner diameter
$D_F$: Inner diameter

The invention claimed is:

1. A functional structure comprising:
a support having a porous structure and including a zeolite-type compound; and
a functional material present in the support, wherein
the support has channels communicating with one another,
the channels have any one of a one-dimensional pore, a two-dimensional pore, a three-dimensional pore of a framework structure of the zeolite-type compound, and an enlarged pore portion which is not defined by the framework structure of the zeolite-type compound and has a diameter greater than any one of the one-dimensional pore, the two-dimensional pore and the three-dimensional pore,
the enlarged pore portion has a greater diameter than the functional material,
the functional material has a diameter greater than any one of the one-dimensional pore, the two-dimensional pore and the three-dimensional pore,
the functional material is present at least in the channels of the support,
the functional material present in the support comprises a metal element (M), the content of the metal element (M) is more than 2.5 mass % with respect to the functional structure, the functional material includes metal or metal oxide nanoparticles, and the framework structure of the zeolite-type compound is selected from the group consisting of FAU type, MTW type, MFI type, FER type, LTA type, MWW type, MOR type, LTL type, and BEA type.

2. The functional structure according to claim 1, wherein the functional material present in the support comprises at least one of a metal and a metal oxide.

3. The functional structure according to claim 1, wherein the functional material is present at least in the enlarged pore portion.

4. The functional structure according to claim 3, wherein the enlarged pore portion connects a plurality of pores constituting any one of the one-dimensional pore, the two-dimensional pore, and the three-dimensional pore.

5. The functional structure according to claim 1, wherein the functional material comprises a catalytic material carried by the support.

6. The functional structure according to claim 1, wherein the channels have an average inner diameter of 0.1 nm to 1.5 nm.

7. The functional structure according to claim 1, further comprising at least one additional functional material held on an outer surface of the support.

8. The functional structure according to claim 7, wherein the content of at least one functional material present in the support is higher than the content of the at least one additional functional material held on the outer surface of the support.

9. The functional structure according to claim 1, wherein the zeolite-type compound is a silicate compound.

10. The functional structure according to claim 1, wherein:

the functional material is enclosed in the porous structure of the support, and the functional material and the support are in indirect contact with each other due to the presence of an additional material in between so that movement of the at least one functional material is restricted.

* * * * *